United States Patent [19]

Pollet et al.

[11] Patent Number: 4,567,102

[45] Date of Patent: Jan. 28, 1986

[54] HOT MELT SIZE

[75] Inventors: Jean-Claude Pollet, Granville; Gordon P. Armstrong, Newark; Martin C. Flautt, Granville, all of Ohio

[73] Assignee: Owens-Corning Fiberglas Corporation, Toledo, Ohio

[21] Appl. No.: 613,940

[22] Filed: May 24, 1984

[51] Int. Cl.$^4$ .................... B32B 9/00; B32B 25/20
[52] U.S. Cl. ..................... 428/391; 525/487; 525/488; 428/392; 523/206; 65/3.41; 65/3.43; 65/3.44
[58] Field of Search ............... 525/487, 488; 428/391, 428/392; 523/206

[56] References Cited

U.S. PATENT DOCUMENTS

| | | | |
|---|---|---|---|
| 2,794,759 | 6/1957 | Dildilian | 154/101 |
| 3,273,987 | 9/1966 | Marzocchi et al. | 65/60 |
| 3,615,106 | 10/1971 | Flanagan et al. | 524/488 |
| 3,929,938 | 12/1975 | White et al. | 524/488 |
| 4,006,272 | 2/1977 | Sakaguchi et al. | 428/268 |
| 4,056,651 | 11/1977 | Scola | 428/336 |
| 4,127,619 | 11/1978 | Godfrey | 524/487 |
| 4,136,069 | 1/1979 | Vachon et al. | 428/375 |
| 4,167,433 | 9/1979 | Lakshmanan | 524/487 |
| 4,299,745 | 11/1981 | Godfrey | 524/488 |
| 4,316,929 | 2/1982 | McIntire et al. | 428/262 |
| 4,394,475 | 7/1983 | Temple et al. | 524/487 |

Primary Examiner—John C. Bleutge
Assistant Examiner—Robert E. L. Sellers, II
Attorney, Agent, or Firm—Ronald C. Hudgens; Patrick P. Pacella; Bryan H. Davidson

[57] ABSTRACT

A hot melt, non-aqueous glass size composition consists of an ethylene-ethylacrylate copolymer, a micro-crystalline wax, a phenolic-modified terpene resin and a silane.

9 Claims, No Drawings

HOT MELT SIZE

TECHNICAL FIELD

This invention relates to hot melt sizes, or coatings, for glass fibers.

In one of its more specific aspects, this invention relates to hot melt, non-aqueous sizes for glass fibers used as reinforcement in resins.

BACKGROUND OF THE INVENTION

The production of glass fibers and attendant application of aqueous sizes is well known. Such fibers are wound into packages which are subsequently dried prior to incorporation into resins which they are intended to reinforce.

Considerable drying expense could be saved if non-aqueous sizes were available which could be applied in liquid form and which solidified to provide a protective coating without need for drying. Additional benefit could be derived from such sizes if there could be incorporated therein an agent which facilitated adherence between the glass fiber, itself, and the resin.

This invention is directed to the solution of that problem.

STATEMENT OF THE INVENTION

According to this invention there is provided a non-aqueous hot melt coating composition consisting of an ethylene-ethyl acrylate copolymer, a low molecular weight polyethylene wax, a chemically-modified terpene resin and a silane.

Also, according to this invention, there is provided a glass fiber coated with the above-defined composition and a resin reinforced with the coated glass fiber.

DESCRIPTION OF THE INVENTION

The invention is employable with any glass conventionally employed as reinforcement of resins.

Similiarly, the glass can be employed to reinforce any resins including polyolefins, thermoplastics, polyesters, styrene-based resins, and the like.

The hot melt size of this invention is a 100 percent solids formulation applied as a hot melt to the glass fibers as they are formed, that is, at the place in their formation at which aqueous sizes are applied, that is, between the bushing and the collet on which the fibers are wound as a package.

The coating of this invention can consist of any suitable ethylene-ethyl acrylate copolymer.

Preferably, the copolymer will be an ethylene-ethyl acrylate copolymer, plasticizer-free, will have a melt index (ASTM D1238, grams/10 min) of about 20, a density (g/cm$^3$) of about 0.93, a ring and ball softening point (ASTM E-28) of about 128° C., a DSC melting point of about 94° C., and a comonomer weight percentage of about 18.

One suitable material is an ethylene copolymer, DPDA-9169, available from Union Carbide, Danbury, Conn.

In the preferred embodiment, the ethylene-ethyl acrylate copolymer will be employed in an amount within the range of from about 5 to about 35 weight percent, preferably in an amount of about 24.5 weight percent.

Any suitable low molecular weight polyethylene wax can be employed. Preferably, the wax will be a microcrystalline having a melting point (ASTM D-127) of about 199° F., a penetration (ASTM D-1321 @ 77° F.) of about 0.5 mm, a viscosity at 210° F. (ASTM D-88SUS) of about 78, and a specific gravity (75° F.) of 0.93.

In the preferred, embodiment, the microcrystalline wax will be employed in an amount within the range of from about 10 to about 80 weight percent, preferably in an amount of about 49.0 weight percent. One particularly suitable microcrystalline wax is Petrolite® C-1035 available from Bareco, a Division of Petrolite Corp., Tulsa, Okla.

Any suitable chemically-modified terpene resin can be employed. Preferably, the resin will be a phenolic-modified terpene resin which is highly alkylated, non-reactive, methylol-free resin having a weight average molecular weight within the range of from about 400 to about 600, a Ring and Ball softening point of from 132° to about 138° C., a specific gravity of about 1.03, a COC flashpoint of about 515° F. and melt viscosities of 1, 10 and 100 poises, at 220, 190 and 165 C., respectively. It will have a Gardner-Holdt viscosity at 25° C. (70% solids solution in toluene) of T-X. One particularly suitable resin is Piccofyn® Resin A135 available from Hercules, Inc., Wilmington, Del.

In the preferred embodiment of the invention, the phenolic-modified terpene resin will be employed in an amount within the range of from 5 to about 60 weight percent, preferably in an amount of about 24.5 weight percent.

Any suitable silane can be employed in the composition of this invention. Suitable silanes include gamma-glycidoxypnopyltrimethyoxy, gamma-methacryloxypropyl trimethoxysilane and gamma-aminopropyl trimethoxysilane, with the latter being preferred.

In the preferred embodiment of the invention the silane will be employed in an amount within the range of from about 0.1 to about 4.0 weight percent and preferably in an amount of about 2 weight percent.

The materials of the coating can be mixed in any suitable manner. Preferably, each will be heated until liquid and the liquids mixed at a temperature above their solidification points. One preferred way is is to melt the wax, add the ethylene-ethyl acrylate, stir and let it melt and disperse, add the chemically modified terpene, stir and let it melt and disperse, add the silane and blend.

The size can be applied to the strands in any suitable manner. The strand can be run through a vat of the coating with, or without, subsequent wiping or the size can be rolled on or wiped on.

It will be evident from the foregoing that various modifications can be made to this invention. Such, however, are considered within the scope of the invention.

What is claimed is:

1. A glass fiber having on its surface a coating consisting of an ethylene-ethylacrylate copolymer, a low molecular weight polyethylene wax, a phenolic-modified terpene resin, and an organosilane.

2. A glass fiber as in claim 1 wherein said ethylene-ethylacrylate copolymer is contained in an amount within the range of from about 5 to about 35 weight percent.

3. A glass fiber as in claim 1 wherein said low molecular weight polyethylene wax is a micro-crystalline wax contained in an amount within the range of from about 10 to about 80 weight percent.

4. A glass fiber as in claim 1 wherein said phenolic-modified terpene has a number average molecular weight within the range of from about 400 to about 600.

5. A glass fiber as in claim 1 wherein said organosilane is gamma-aminopropyl trimethoxysilane.

6. A glass fiber as in claim 1 wherein the coating consists, approximately, in parts by weight, of
ethylene-ehtylacrylate copolymer 5-35
low molecular weight polyethylene was 10-80
phenolic-modified terpene resin 5-60
organosilane 0.1-4.

7. A glass fiber as in claim 1 wherein the coating consists, approximately, in parts by weight, of
ethylene-ehtylacrylate copolymer 24.5
low molecular weight polyethylene wax 49.0
phenolic-modified terpene resin 24.5
organosilane 2.0.

8. A glass fiber having on its surface a coating consisting in approximate parts by weight (pbw) of 24.5 pbw ethylene-ethylacrylate copolymer, 49.0 pbw low molecular weight polyethylene wax, 24.5 pbw phenolic-modified terpene resin, and 2.0 pbw organosilane.

9. A resin reinforced with glass fibers, each said glass fiber having a coating consisting of an ethylene-ethylacrylate copolymer, a low molecular weight polyethylene wax, a phenolic-modified terpene resin, and an organosilane.

* * * * *